US010780590B2

(12) United States Patent
Gold et al.

(10) Patent No.: US 10,780,590 B2
(45) Date of Patent: Sep. 22, 2020

(54) APPARATUS, SYSTEM, AND METHOD FOR RELOCATING DATA-CENTER MODULES

(71) Applicant: Facebook, Inc., Menlo Park, CA (US)

(72) Inventors: Andrew Gold, Los Altos, CA (US); Scott C. Wiley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 212 days.

(21) Appl. No.: 15/784,118

(22) Filed: Oct. 14, 2017

(65) Prior Publication Data

US 2019/0111574 A1  Apr. 18, 2019

(51) Int. Cl.
*B25J 15/04* (2006.01)
(52) U.S. Cl.
CPC .......... *B25J 15/04* (2013.01); *B25J 15/0408* (2013.01); *B25J 15/0491* (2013.01)
(58) Field of Classification Search
CPC .... B25J 15/04; B25J 15/0408; B25J 15/0057; B25J 15/0061
See application file for complete search history.

(56) References Cited

U.S. PATENT DOCUMENTS

| 5,974,643 | A | * | 11/1999 | Hays | B23Q 17/2233 |
| | | | | | 29/39 |
| 6,725,532 | B1 | * | 4/2004 | Okada | H05K 13/0411 |
| | | | | | 414/752.1 |
| 9,974,235 | B2 | * | 5/2018 | Van De Vegte | A01G 18/00 |
| 10,265,863 | B2 | * | 4/2019 | Corkum | B25J 15/04 |

OTHER PUBLICATIONS

Antoine Reversat; The mobile device lab at the Prineville data center; https://code.facebook.com/posts/300815046928882/the-mobile-device-lab-at-the-prineville-data-center/; as accessed Jul. 7, 2017 (dated Jul. 13, 2016).

* cited by examiner

*Primary Examiner* — Jonathan Snelting
(74) *Attorney, Agent, or Firm* — FisherBroyles, LLP (57) ABSTRACT

A data-center-module relocation device may include a plurality of interchangeable end effectors, including at least one module relocation effector that is dimensioned to hold data-center modules. The device may also include a robotic arm with a distal end adapted to switch between the plurality of interchangeable end effectors and select the module relocation effector as an active end effector for the robotic arm. In addition, the device may include an actuator that moves the robotic arm to cause the robotic arm to relocate, from one location in a data center to another location in the data center, a data-center module held by the module relocation effector. Various other apparatuses, systems, and methods are also disclosed.

20 Claims, 9 Drawing Sheets

APPARATUS, SYSTEM, AND METHOD FOR RELOCATING DATA-CENTER MODULES

BACKGROUND

Large organizations increasingly depend on complex information technology systems. The growth of cloud computing has also contributed to a need for improvements in the storage of such technology, often in data centers that provide networked storage and processing capabilities. Data centers may host an abundance of hardware that perform various computing functions for organizations. For example, data centers may contain servers to process data and routers to transmit the data. These and other hardware may further require power supplies and networking infrastructure.

To maintain the abundance of computing hardware, some data centers may use automated systems to run more efficiently and effectively. For example, a "lights-out" data center may reduce the amount of power needed to sustain the data center, and fewer personnel may be required to manage the data center. Automated systems may perform some functions previously performed by personnel, but traditional automation systems may not be well-suited for use in moving data center equipment due to the complex connections and differing sizes of such equipment. Therefore, automated data center systems may need the ability to manage and relocate various types of equipment.

SUMMARY

As will be described in greater detail below, the instant disclosure describes various apparatuses, systems, and methods for relocating data-center modules by automatically switching between tools for different modules. In one example, a data-center-module relocation device may include a plurality of interchangeable end effectors, including one or more module relocation effectors that are dimensioned to hold data-center modules. The device may also include a robotic arm with a distal end adapted to switch between the plurality of interchangeable end effectors and select a module relocation effector as an active end effector for the robotic arm. Additionally, the device may include an actuator that moves the robotic arm to cause the robotic arm to relocate, from one location in a data center to another location in the data center, a data-center module held by the module relocation effector.

In some embodiments, the module relocation effector may include a module receptacle. Additionally or alternatively, the module relocation effector may include a module mounting tool. In these embodiments, the module mounting tool may be coupled to the module receptacle such that the module mounting tool facilitates transfer of the data-center module from the location in the data center to the module receptacle. The module mounting tool may also be coupled to the module receptacle such that the module mounting tool facilitates transfer of the data-center module from the module receptacle to the other location in the data center. Furthermore, the module mounting tool may be customized for a dimension of the data-center module, a cable connection of the data-center module, an attachment of the data-center module, and/or a mounting mechanism of the data-center module.

In some examples, the distal end of the robotic arm may include a selection module that receives information about a type of the data-center module, a rotatable unit that rotates to select the module relocation effector from the plurality of interchangeable end effectors as the active end effector, and/or a connection that mates with the module relocation effector stored in an effector holder. In these examples, the rotatable unit may select the module relocation effector as the active end effector for the robotic arm based on the received information about the type of the data-center module. Additionally, in these examples, the actuator may be configured to move the robotic arm to facilitate mating with the module relocation effector stored in the effector holder.

In one embodiment, the robotic arm may be configured to utilize the module relocation effector to remove the data-center module from the location. Additionally or alternatively, the robotic arm may be configured to utilize the module relocation effector to install the data-center module to the other location.

According to various embodiments, a corresponding data-center-module relocation system may include one or more data-center-module housing mechanisms and one or more data-center modules stored in the data-center-module housing mechanisms. The system may also include a robotic relocation apparatus that includes a plurality of interchangeable end effectors with one or more module relocation effectors that are dimensioned to hold data-center modules, a robotic arm with a distal end adapted to switch between the plurality of interchangeable end effectors and select a module relocation effector as an active end effector for the robotic arm, and an actuator that moves the robotic arm to cause the robotic arm to relocate the data-center module from one location in a data center to another location in the data center.

In one example, a data-center-module housing mechanism may store the data-center modules in a plurality of slots such that a face of the data-center-module housing mechanism exposes the data-center module to the robotic relocation apparatus. In this example, the robotic relocation apparatus may be coupled to a gantry robot that is configured to move the data-center module parallel to the face of the data-center-module housing mechanism and/or a mobile assembly that facilitates moving the gantry robot from the data-center-module housing mechanism to an additional data-center-module housing mechanism. Furthermore, in this example, the robotic arm may be configured to utilize the module relocation effector to remove the data-center module from a slot in the data-center-module housing mechanism. Additionally or alternatively, the robotic arm may be configured to utilize the module relocation effector to install the data-center module to another slot in the data-center-module housing mechanism or to install the data-center module to the additional data-center-module housing mechanism.

In one embodiment, the plurality of interchangeable end effectors may be stored in a rotatable unit coupled to the distal end of the robotic arm. Additionally or alternatively, the plurality of interchangeable end effectors may be stored in an effector holder stored in a secondary data-center-module housing mechanism.

In some examples, the module relocation effector may be customized for a dimension of the data-center module and/or a dimension of the data-center-module housing mechanism. Additionally or alternatively, the module relocation effector may be customized for a mounting mechanism that secures the data-center module to the data-center-module housing mechanism.

In some embodiments, the above system may further include one or more additional robotic relocation apparatuses configured to facilitate swapping the data-center module with an additional data-center module. In these embodiments, an additional robotic relocation apparatus may include an additional robotic arm adapted to select an additional module relocation effector that is dimensioned to hold the additional data-center module concurrent with the module relocation effector holding the data-center module.

In addition to the various systems and apparatuses described herein, the instant disclosure presents exemplary methods for relocating data-center modules. For example, a corresponding method may include dimensioning one or more module relocation effectors in a plurality of interchangeable end effectors to hold data-center modules. The method may also include adapting a distal end of a robotic arm to switch between the plurality of interchangeable end effectors and select a module relocation effector as an active end effector for the robotic arm. Additionally, the method may include configuring an actuator to move the robotic arm to cause the robotic arm to relocate, from one location in a data center to another location in the data center, a data-center module held by the module relocation effector.

In one embodiment, dimensioning the module relocation effector to hold the data-center module may include customizing the module relocation effector for a dimension of the data-center module. Additionally or alternatively, dimensioning the module relocation effector to hold the data-center module may include customizing the module relocation effector for a cable connection of the data-center module, an attachment of the data-center module, and/or a mounting mechanism of the data-center module.

In some examples, adapting the distal end of the robotic arm may include coupling a selection module that receives information about a type of the data-center module to the distal end of the robotic arm, coupling a rotatable unit that rotates to select the module relocation effector from the plurality of interchangeable end effectors as the active end effector, and/or coupling a connection that mates with the module relocation effector stored in an effector holder to the distal end of the robotic arm. In these examples, configuring the actuator may include facilitating mating the robotic arm with the module relocation effector stored in the effector holder.

In some embodiments, the above method may further include configuring the robotic arm to utilize the module relocation effector to remove the data-center module from the location. Additionally or alternatively, the above method may include configuring the robotic arm to utilize the module relocation effector to install the data-center module to the other location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for relocating data-center modules. As will be explained in greater detail below, embodiments of the instant disclosure may improve data-module relocation systems by switching between different end effectors to select the appropriate module relocation effector for a specific type of module. A robotic arm may automatically couple with the appropriate module relocation effector to install, store, and/or remove a particular data-center module. For example, the robotic arm may include a rotating unit that cycles through a variety of module relocation effectors to activate the correct end effector for the data-center module. The disclosed embodiments may also include various other tools to manage cables or mounting mechanisms for the data-center module. Additionally, such a system may be implemented as part of and/or referred to herein as a gantry robot or a mobile assembly to relocate data-center modules between multiple data-center-module housing mechanisms. Thus, the disclosed embodiments may automatically select tools on-the-fly to relocate various types of equipment in data centers.

The following will provide, with reference to FIGS. 1-7, examples of data-center-module relocation devices. In addition, the discussion associated with FIG. 8 will provide examples of data-center-module relocation systems that include the data-center-module relocation devices illustrated in FIGS. 1-7. Finally, the discussion corresponding to FIG. 9 will provide examples of methods for manufacturing, assembling, configuring, and/or using the data-center module relocation mechanisms presented herein.

Figure 1A:
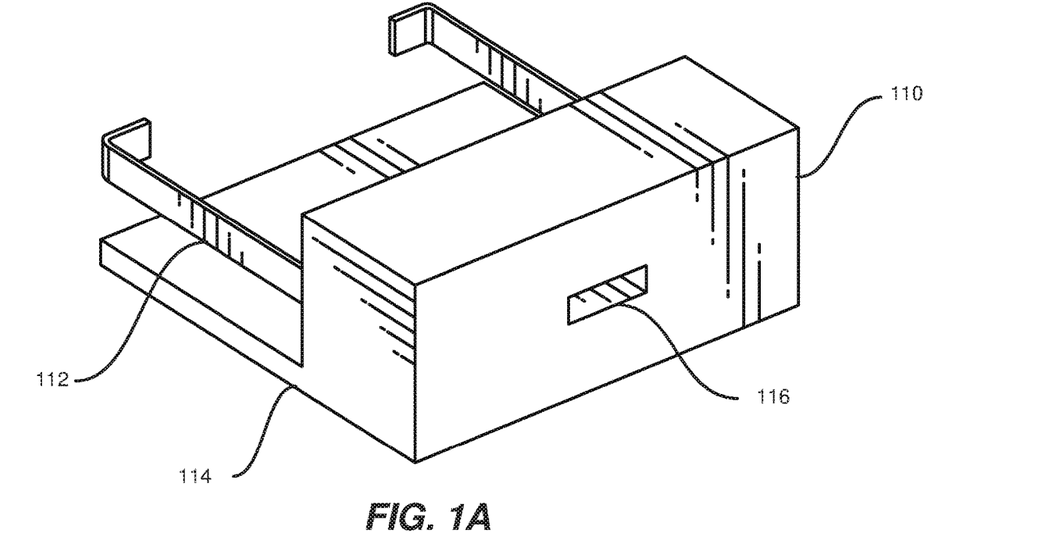
FIG. 1A and FIG. 1B are perspective views of two module relocation effectors of different dimensions.
Figure 1B:
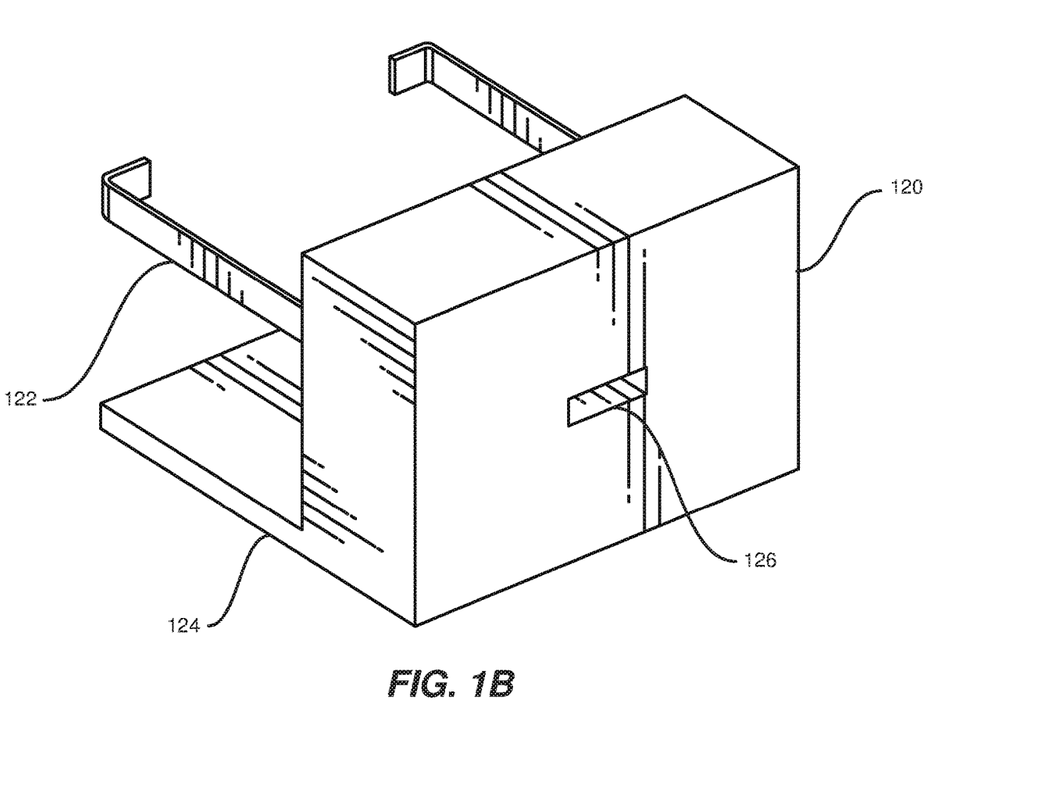

FIG. 1A and FIG. 1B illustrate perspective views of a module relocation effector 110 and a module relocation effector 120, respectively. The term "effector," as used herein, generally refers to a tool or machine that facilitates the performance of a specific action. Notably, a module relocation effector may facilitate relocating a data-center module. As used herein, the term "data center" generally refers to a facility that houses and/or stores electronic and computing equipment for ongoing computing processes. The term "data-center module," as used herein, generally refers to a specific component or piece of equipment used in a data center. Examples of data-center modules may include, without limitation, servers, storage devices, client computing devices, network switches, routers, power supplies, entire rack drawers, discrete electronics (e.g., capacitors, inductors, resistors, microprocessors, hardware accelerators, etc.) individual components or sets of components within rack drawers, and/or any other electronic or computing equipment or components.

In some examples, module relocation effector 110 may include a module receptacle 114 and/or a module mounting tool 112. Similarly, module relocation effector 120 may include a module receptacle 124 and/or a module mounting tool 122. In these examples, module mounting tool 112 and module mounting tool 122 may represent various mechanisms to facilitate mounting and/or dismounting of different data-center modules from a housing mechanism.

In one embodiment, module relocation effectors 110 and 120 may be customized for a dimension of a data-center module and/or a dimension of a data-center-module housing mechanism. Additionally or alternatively, module relocation effectors 110 and 120 may be customized for a mounting mechanism that secures the data-center module to the data-center-module housing mechanism. The term "data-center-module housing mechanism," as used herein, generally refers to a framework or storage unit for data-center modules. For example, a data-center-module housing mechanism may include a data center rack that houses multiple modules of various sizes and specifications. Module relocation effectors 110 and 120 may then be customized for modules of specific sizes or specifications.

As illustrated in FIGS. 1A and 1B, module relocation effectors 110 and 120 may include additional components for facilitating module relocation. For example, module relocation effector 110 may include an effector connection 116 that enables module relocation effector 110 to be selected and/or activated by a robotic arm. Similarly, module relocation effector 120 may include an effector connection 126 that enables module relocation effector 120 to be selected and/or activated by the robotic arm.

Figure 2A:
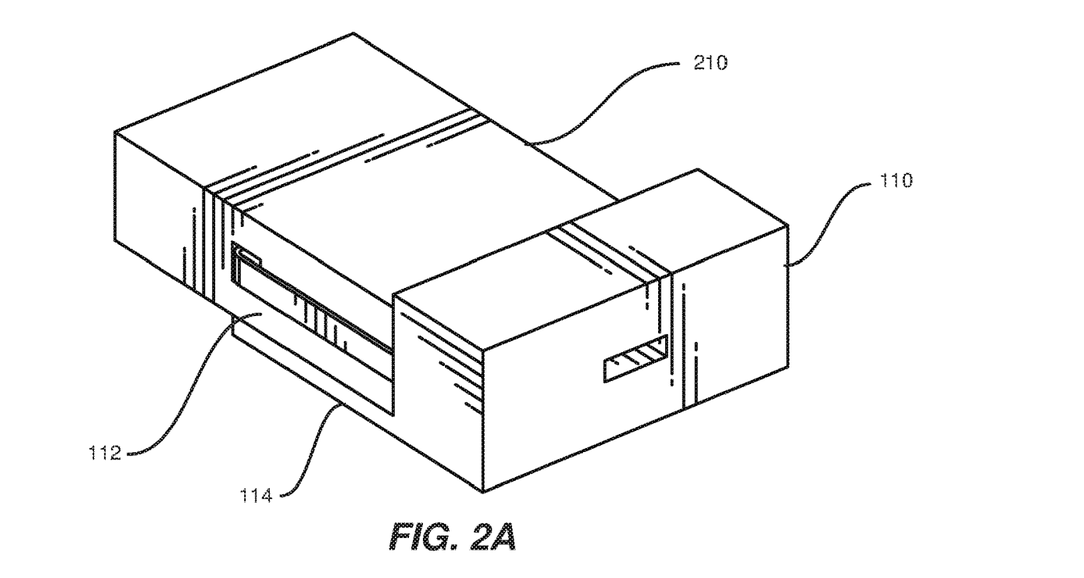
FIG. 2A and FIG. 2B are perspective views of the module relocation effectors holding data-center modules of different dimensions.
Figure 2B:
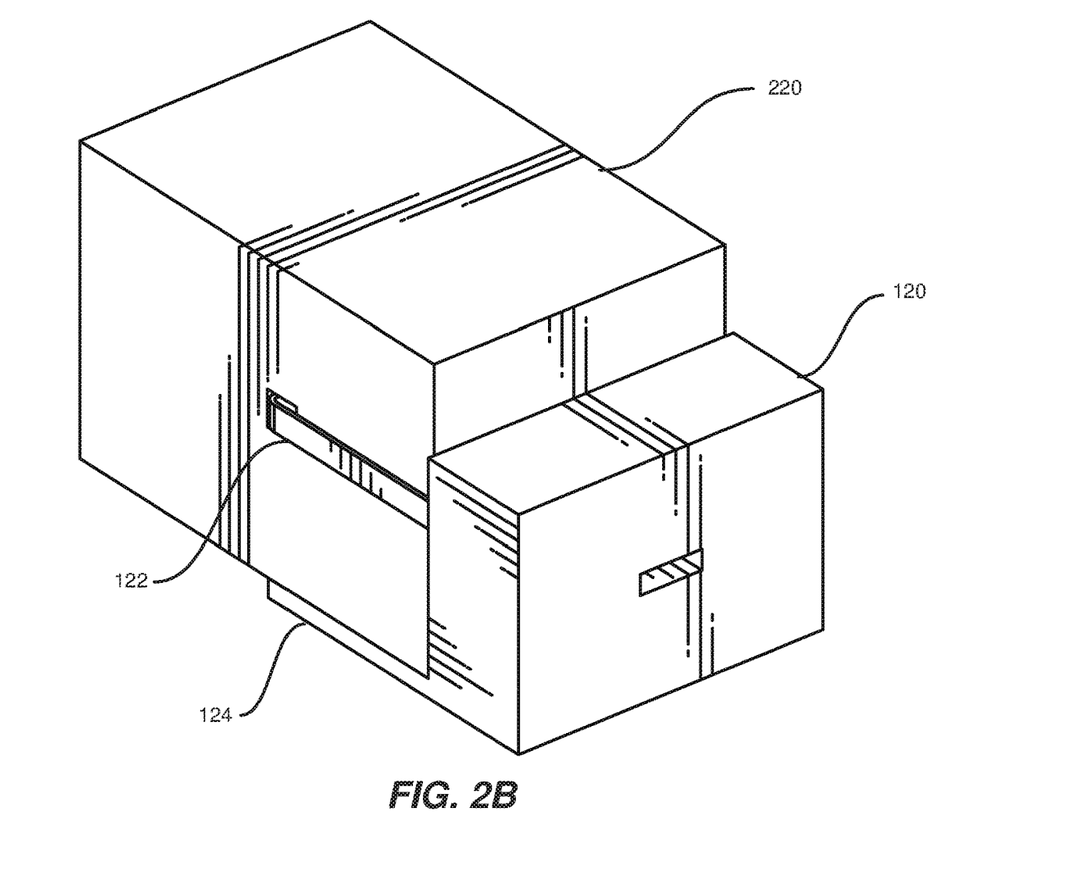

FIG. 2A and FIG. 2B illustrate perspective views of module relocation effectors 110 and 120 holding data-center modules of different dimensions. In one example, module relocation effector 110 may be dimensioned to hold a data-center module 210, and module relocation effector 120 may be dimensioned to hold a data-center module 220. In this example, module mounting tool 112 and module mounting tool 122 may represent similar tools to facilitate mounting and/or dismounting of data-center module 210 and data-center module 220, respectively. Furthermore, as shown in FIGS. 2A and 2B, data-center module 220 may be taller than data-center module 210, and module relocation effector 120 may be dimensioned to hold taller data-center modules than module relocation effector 110.

In some embodiments, module mounting tool 112 may be coupled to module receptacle 114 such that module mounting tool 112 facilitates transfer of data-center module 210 from a location in the data center to module receptacle 114 and from module receptacle 114 to another location in the data center. Additionally, module mounting tool 112 may be customized for a dimension of data-center module 210, a cable connection of data-center module 210, an attachment of data-center module 210, and/or a mounting mechanism of data-center module 210. Similarly, module mounting tool 122 may be coupled to module receptacle 124 such that module mounting tool 122 facilitates transfer of data-center module 220 from the location in the data center to module receptacle 124 and from module receptacle 124 to the other location in the data center. In these embodiments, module mounting tool 122 may be customized for a dimension of data-center module 220, a cable connection of data-center module 220, an attachment of data-center module 220, and/or a mounting mechanism of data-center module 220. For example, module mounting tool 112 may facilitate removing data-center module 210 from a data-center-module housing mechanism by disengaging the mounting mechanism. As another example, an alternative module mounting tool may facilitate mounting data-center module 210 to the data-center-module housing mechanism by plugging power and network cables into data-center module 210.

Figure 3:
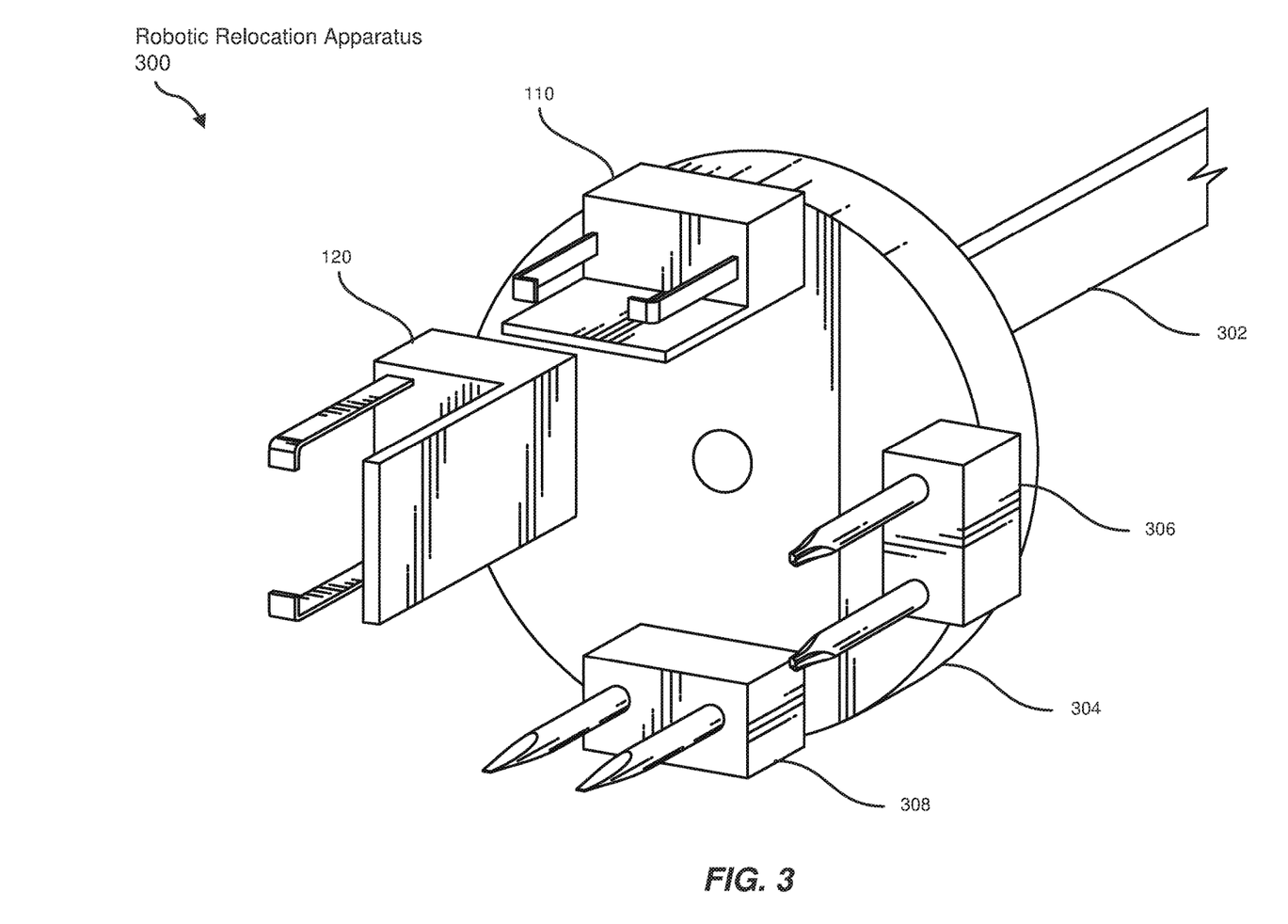
FIG. 3 is a perspective view of a robotic arm with a rotatable unit containing a plurality of interchangeable end effectors.

FIG. 3 is a perspective view of a robotic relocation apparatus 300. In one embodiment, robotic relocation apparatus 300 may include a robotic arm 302 coupled to a rotatable unit 304 containing a plurality of interchangeable end effectors that may include one or more module relocation effectors that are dimensioned to hold data-center modules. In the example of FIG. 3, the plurality of interchangeable end effectors may include module relocation effector 110, module relocation effector 120, an end effector 306, and an end effector 308. In this example, end effector 306 and end effector 308 may represent different screwdrivers dimensioned to facilitate mounting and/or dismounting data-center modules.

In some examples, robotic arm 302 may include a distal end adapted to switch between the plurality of interchangeable end effectors and select the appropriate module relocation effector as an active end effector for robotic arm 302. In these examples, the plurality of interchangeable end effectors may be coupled to the face of rotatable unit 304, which may be coupled to the distal end of robotic arm 302. For example, to relocate data-center module 210 of FIG. 2A, the distal end may include rotatable unit 304 that rotates to select module relocation effector 110 from the plurality of interchangeable end effectors.

In some embodiments, the distal end of robotic arm 302 may further include a selection module that receives information about a type of data-center module 210. For example, the selection module may include a sensor that detects the type of data-center module 210. In another example, the selection module may include a software component that maintains a record of data-center modules, types of data-center modules, and the locations of the data-center modules to determine the type of a data-center module at a specific location. In the above embodiments, rotatable unit 304 may then select module relocation effector 110 as the active end effector for robotic arm 302 based on the received information about the type of data-center module 210.

Figure 4:
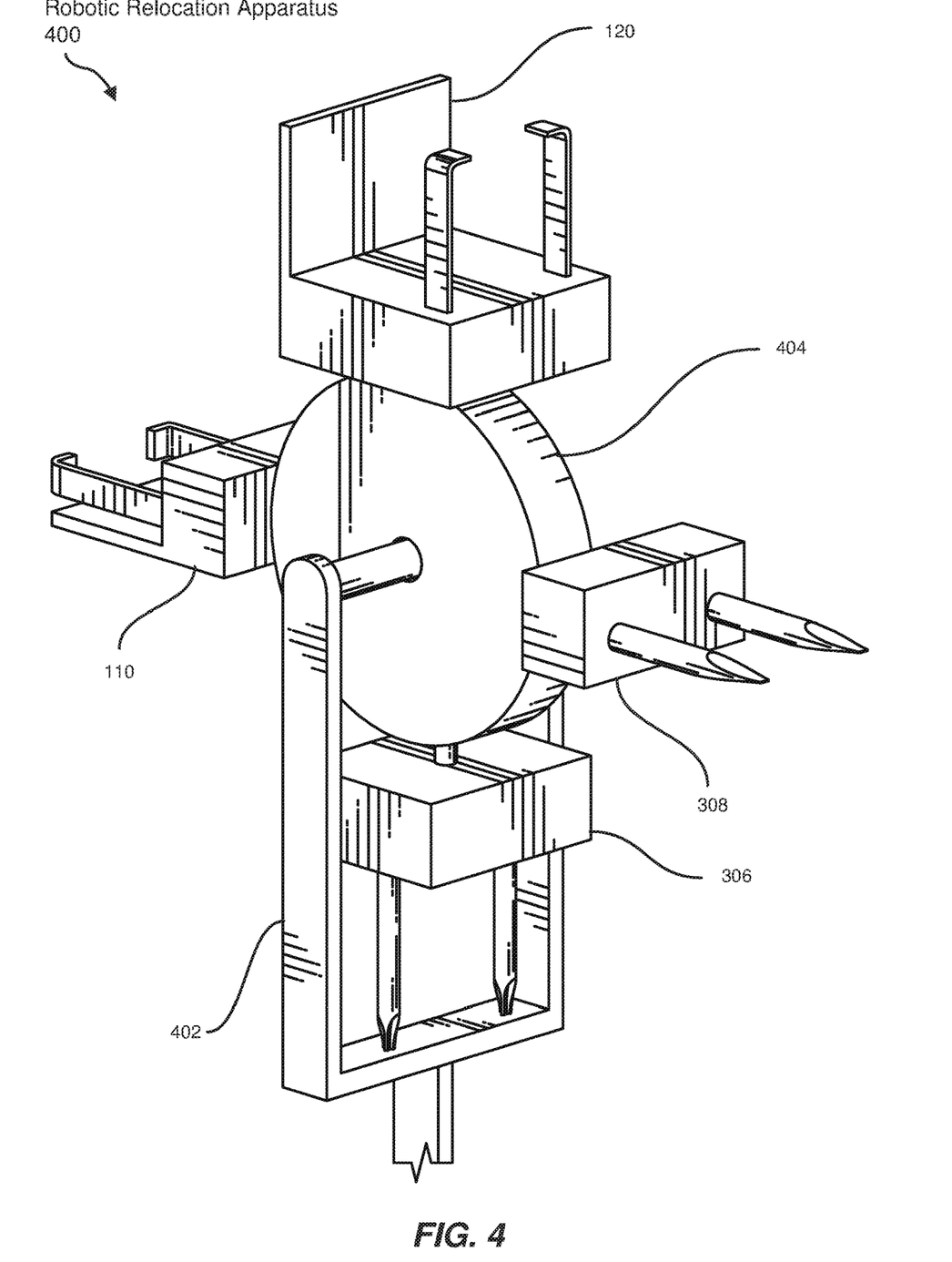
FIG. 4 is a perspective view of an alternative robotic arm with an alternative rotatable unit containing the plurality of interchangeable end effectors.

FIG. 4 is a perspective view of an alternative configuration for a robotic relocation apparatus 400. In one example, robotic relocation apparatus 400 may include a robotic arm 402 coupled to a rotatable unit 404 containing a plurality of interchangeable end effectors, including module relocation effector 110, module relocation effector 120, end effector 306, and end effector 308. In this example, the plurality of interchangeable end effectors may be coupled to the edge of rotatable unit 404, in contrast to the face of rotatable unit 304 in FIG. 3, and robotic arm 402 may provide a frame around rotatable unit 404.

Figure 5A:
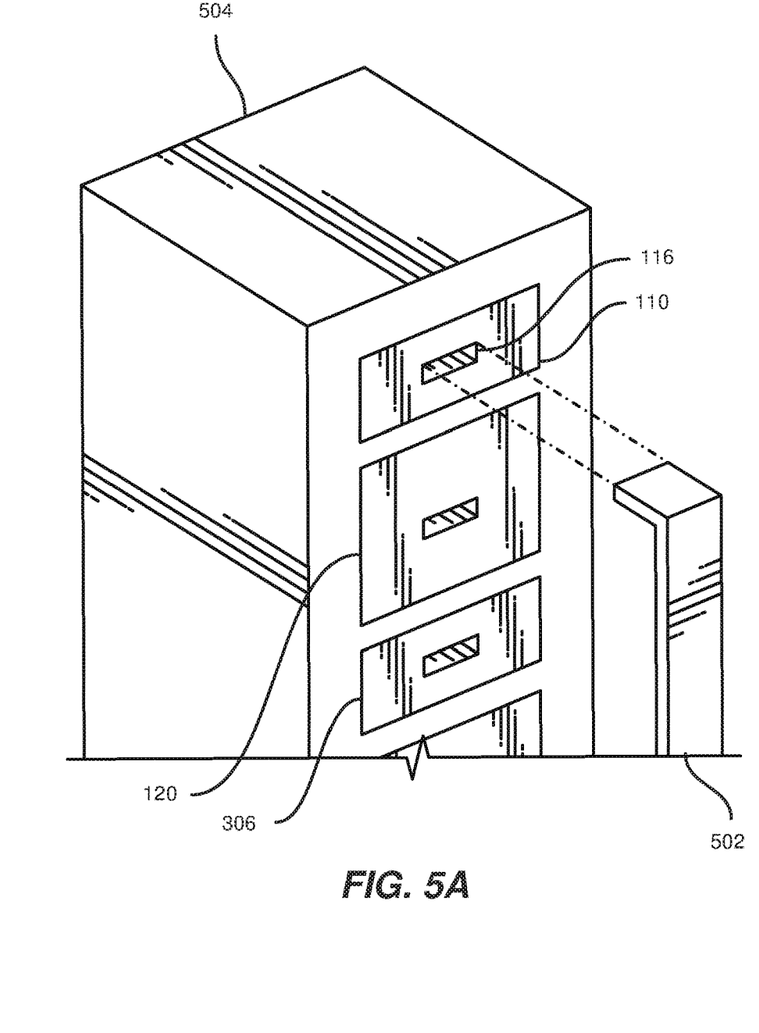
FIG. 5A is a perspective view of a robotic arm with an effector connection and end effectors stored in an effector holder.
Figure 5B:
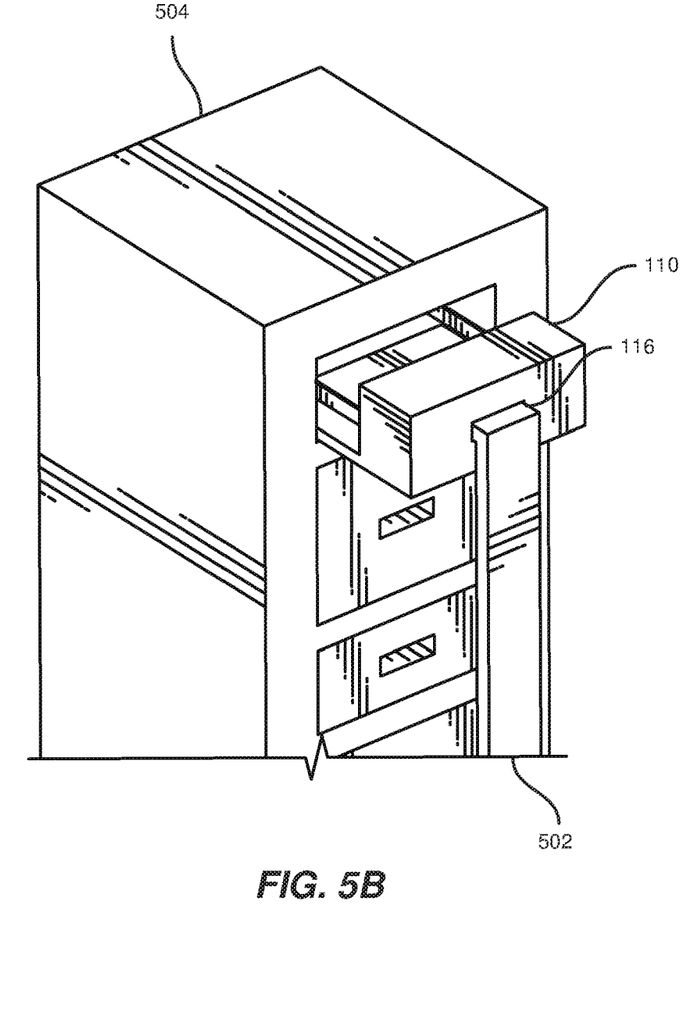
FIG. 5B is a perspective view of the robotic arm with the effector connection mating with a module relocation effector.

FIG. 5A is a perspective view of an alternative robotic arm 502 and a plurality of end effectors stored in an effector holder 504. FIG. 5B is a perspective view of robotic arm 502 subsequently mating with module relocation effector 110.

In the example of FIGS. 5A and 5B, the distal end of robotic arm 502 may include a connection that mates with module relocation effector 110 stored in effector holder 504. In this example, the connection of robotic arm 502 may mate with effector connection 116 of module relocation effector 110. Additionally, the plurality of interchangeable end effectors may be stored in effector holder 504, which may be stored in a secondary data-center-module housing mechanism similar to the data-center-module housing mechanisms storing the data-center modules. Furthermore, an actuator may be configured to move robotic arm 502 to facilitate mating with module relocation effector 110. The term "actuator," as used herein, generally refers to a mechanism that controls other components and/or enables the components to move.

Figure 6:
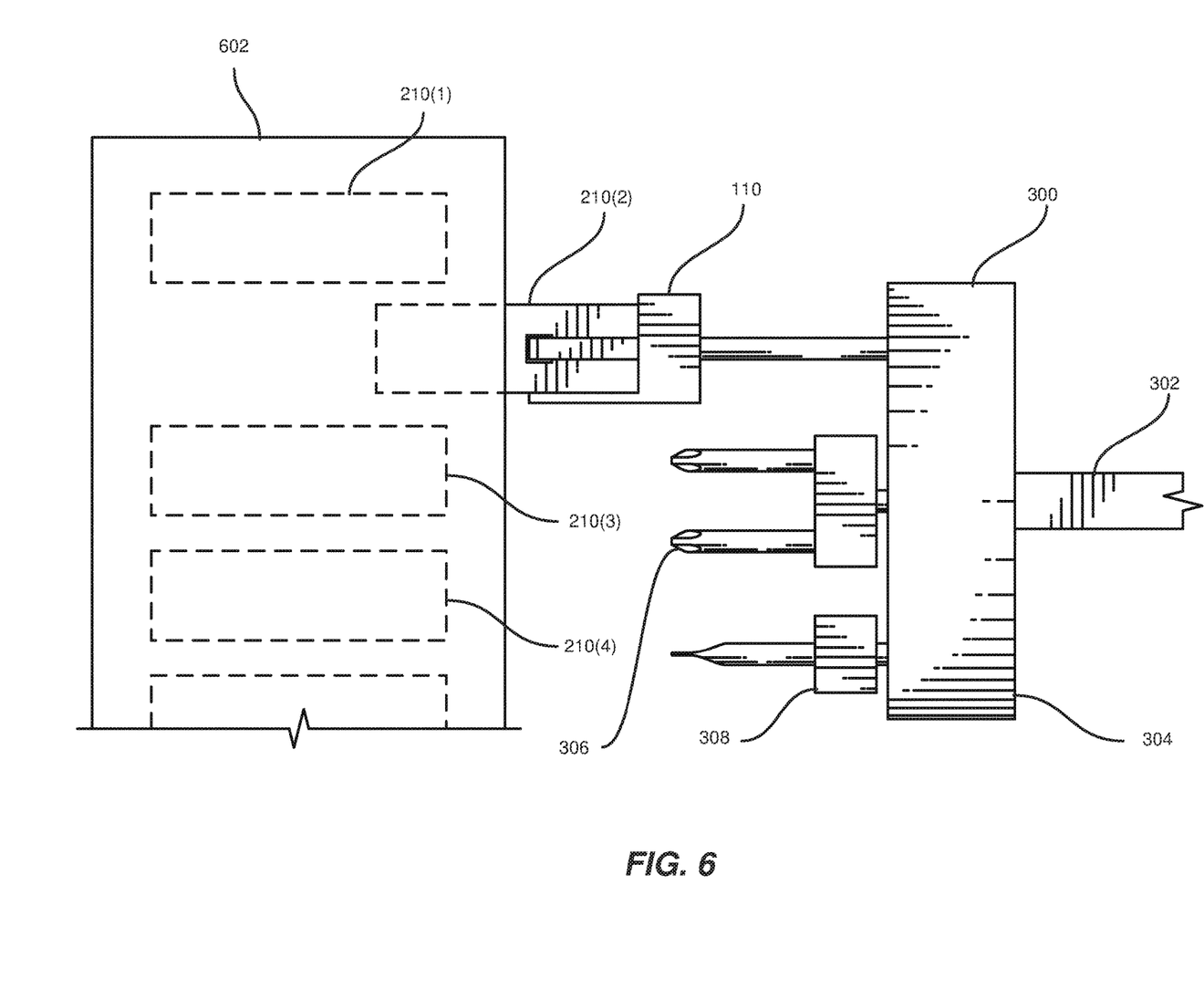
FIG. 6 is a side view of a robotic arm with a rotatable unit installing and/or removing a data-center module stored in a data-center-module housing mechanism.

FIG. 6 is a side view of robotic relocation apparatus 300 of FIG. 3. As illustrated in FIG. 6, a data-center-module housing mechanism 602 may store data-center modules 210(1), 210(2), 210(3), and 210(4) in a plurality of slots. In one embodiment, robotic arm 302 may be configured to utilize module relocation effector 110 to remove data-center module 210(2) from a slot in data-center-module housing mechanism 602. For example, module relocation effector 110 may extend from rotatable unit 304 to remove data-center module 210(2). Additionally or alternatively, robotic arm 302 may be configured to utilize module relocation effector 110 to install data-center module 210(2) to the slot in data-center-module housing mechanism 602.

In other embodiments, robotic relocation apparatus 300 may deploy multiple end effectors to remove and/or install data-center module 210(2). For example, robotic arm 302 may rotate rotatable unit 304 to deploy end effector 306 to unscrew mounting screws in data-center module 210(2). Robotic arm 302 may then rotate rotatable unit 304 to deploy module relocation effector 110 to pull data-center module 210(2) from the slot in data-center-module housing mechanism 602.

Figure 7:
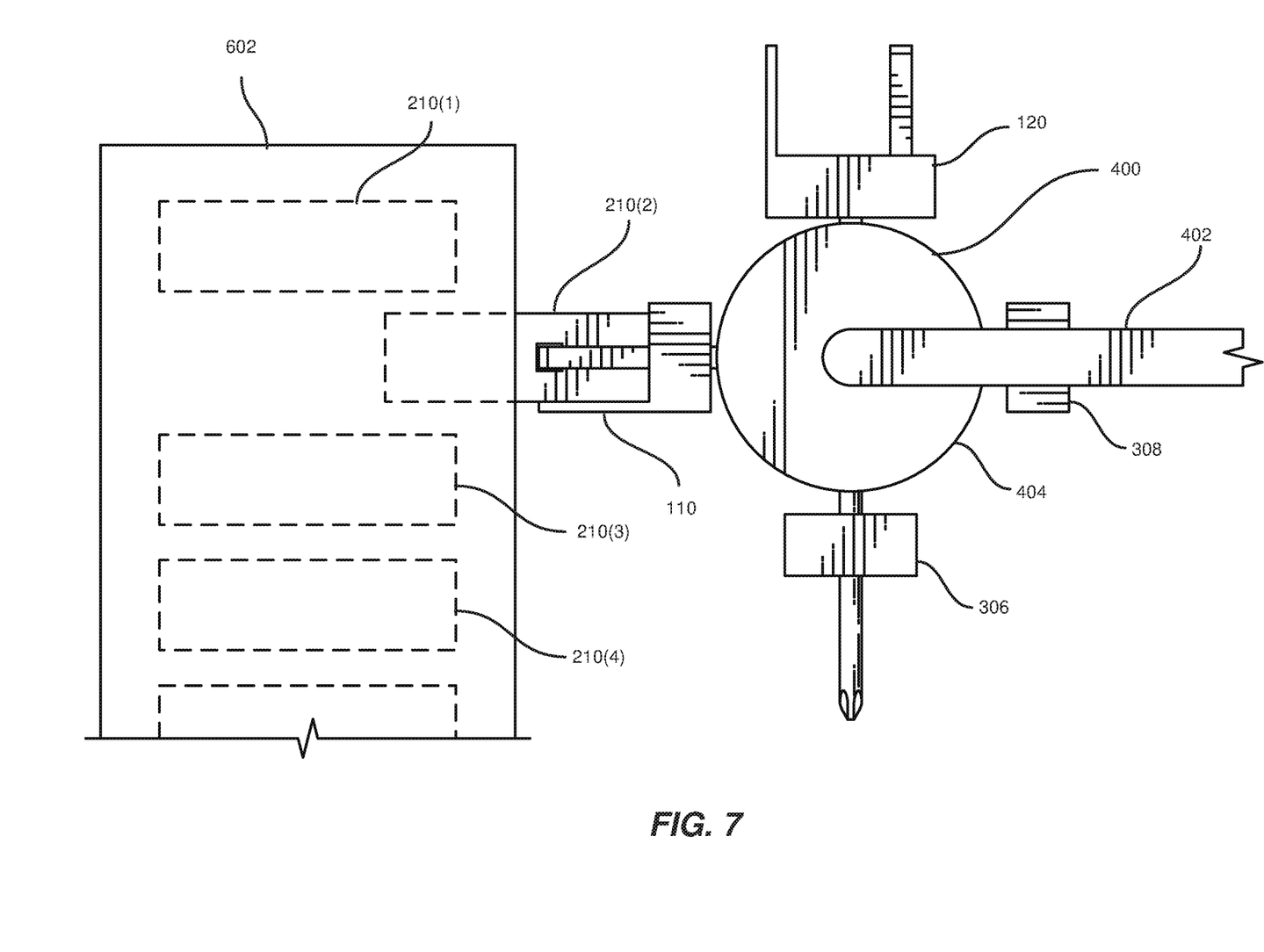
FIG. 7 is a side view of an alternative robotic arm with a rotatable unit installing and/or removing a data-center module stored in a data-center-module housing mechanism.

FIG. 7 is a side view of robotic relocation apparatus 400 of FIG. 4. In this example, robotic arm 402 may be configured to utilize module relocation effector 110 to install and/or remove data-center module 210(2) stored in the slot in data-center-module housing mechanism 602. Similar to robotic relocation apparatus 300, robotic relocation apparatus 400 may deploy module relocation effector 110 and/or multiple end effectors to relocate data-center module 210(2).

Figure 8:
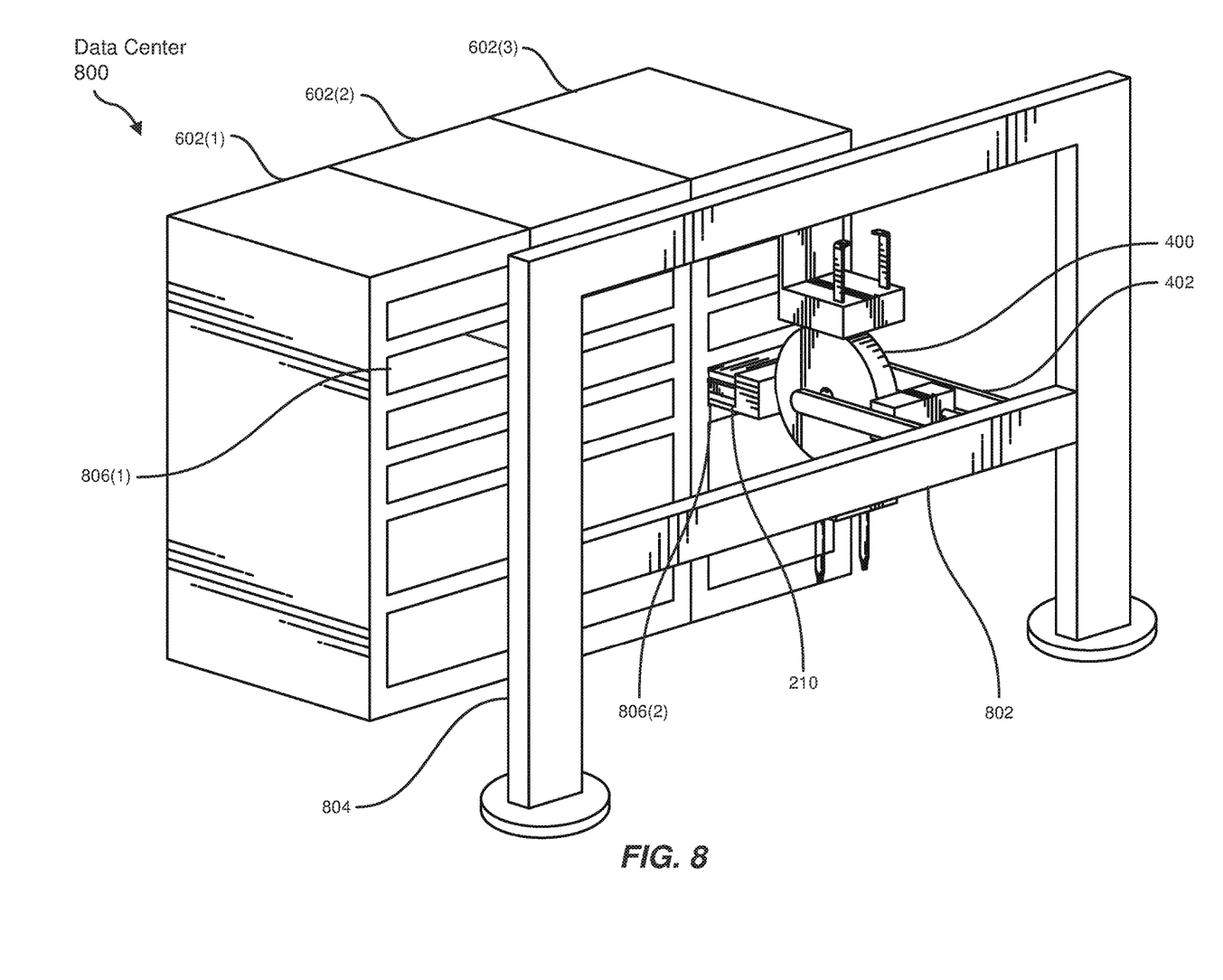
FIG. 8 is a perspective view of a gantry robot and an actuator that moves a robotic arm to relocate a data-center module.

FIG. 8 is a perspective view of a gantry robot 804 and an actuator 802 that moves robotic arm 402 to relocate data-center module 210. The term "gantry robot," as used herein, generally refers to a robotic framework that facilitates horizontal movement of components. In the example of FIG. 8, gantry robot 804 may facilitate both a vertical movement of actuator 802 and, via actuator 802, a horizontal movement of robotic arm 402. In this example, actuator 802 may move robotic arm 402 to cause robotic arm 402 to relocate data-center module 210 using robotic relocation apparatus 400. In some examples, gantry robot 804 may facilitate the setup of a new data center 800 by installing data-center modules. Additionally or alternatively, gantry robot 804 may perform maintenance functions in existing data center 800, such as by relocating data-center modules.

In some embodiments, data center 800 may include data-center-module housing mechanisms 602(1), 602(2), and 602(3). In additional embodiments, data center 800 may include one or more data-center modules, such as data-center module 210, stored in data-center-module housing mechanisms 602(1), 602(2), and 602(3). In these embodiments, data-center-module housing mechanisms 602(1), 602(2), and 602(3) may store the data-center modules in a plurality of slots such that a face of each of data-center-module housing mechanism exposes the data-center modules to robotic relocation apparatus 400. In the example of FIG. 8, gantry robot 804 may parallel the faces of data-center-module housing mechanisms 602(1), 602(2), and 602(3) to enable robotic relocation apparatus 400 to access each data-center module.

In the above embodiments, robotic relocation apparatus 400 may be coupled to gantry robot 804, which may be configured to move data-center module 210 parallel to faces of data-center-module housing mechanisms 602(1), 602(2), and/or 602(3). Additionally or alternatively, robotic relocation apparatus 400 may be coupled to a mobile assembly that facilitates moving gantry robot 804 from data-center-module housing mechanisms 602(1), 602(2), and/or 602(3) to an additional data-center-module housing mechanism. For example, the mobile assembly may move gantry robot 804 on a track between rows of data-center-module housing mechanisms. In other embodiments, the mobile assembly may facilitate moving gantry robot 804 horizontally between data-center-module housing mechanisms 602(1), 602(2), and/or 602(3).

In some examples, robotic arm 402 may utilize robotic relocation apparatus 400 to remove data-center module 210 from a slot 806(1) in data-center-module housing mechanism 602(1). Additionally or alternatively, robotic arm 402 may utilize robotic relocation apparatus 400 to install data-center module 210 to another slot in data-center-module housing mechanism 602(1), such as by moving vertically. In the example of FIG. 8, robotic relocation apparatus 400 may also install data-center module 210 to a slot 806(2) in data-center-module housing mechanism 602(3).

In one embodiment, the data-center-module relocation system described herein may further include one or more additional robotic relocation apparatuses configured to facilitate swapping data-center module 210 with an additional data-center module. In this embodiment, the additional robotic relocation apparatus may include an additional robotic arm adapted to select an additional module relocation effector that may be dimensioned to hold the additional data-center module concurrent with module relocation effector 110 holding data-center module 210. For example, a separate gantry robot may concurrently operate with gantry robot 804 of FIG. 8 to hold additional data-center modules. In another example, gantry robot 804 may include one or more additional robotic arms configured to hold and/or relocate additional data-center modules. In this example, each robotic arm may terminate with a different end effector and/or multiple end effectors. Furthermore, robotic relocation apparatus 400 may hold multiple data-center modules using multiple end effectors, such as holding data-center module 210 using module relocation effector 110 and data-center module 220 using module relocation effector 120.

Figure 9:
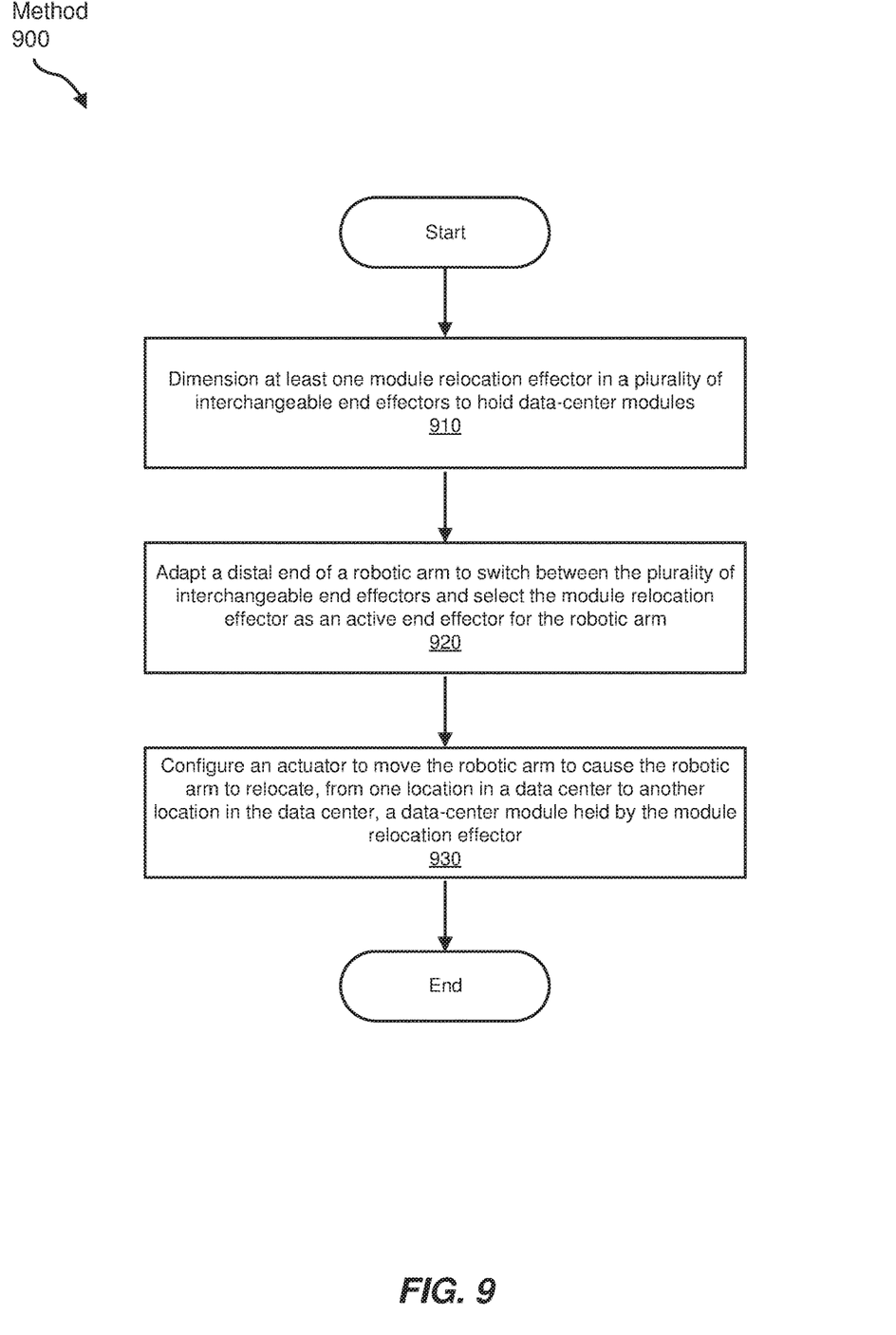
FIG. 9 is a flow diagram of an exemplary method for relocating data-center modules.

FIG. 9 shows an example method for manufacturing, assembling, using, adjusting, or otherwise configuring or creating the systems and apparatuses presented herein. The steps shown in FIG. 9 may be performed by any individual and/or by any suitable type or form of manual and/or automated apparatus. In particular, FIG. 9 illustrates a flow diagram of an exemplary method 900 for assembling a data-center-module relocation device.

As shown in FIG. 9, at step 910, a module relocation effector in a plurality of interchangeable end effectors may be dimensioned to hold data-center modules. For example, as illustrated in FIG. 2A, module relocation effector 110 may be dimensioned to hold data-center module 210. In this example, module relocation effector 110 may be dimensioned to hold data-center module 210 by customizing module relocation effector 110 for a dimension of data-center module 210 and/or a mounting mechanism of data-center module 210. In other examples, module relocation effector 110 may be dimensioned to hold data-center module 210 by customizing module relocation effector 110 for a cable connection of data-center module 210 and/or an attachment of data-center module 210. Furthermore, module relocation effector 110 may hold data center module 210 by securing module 210, by storing module 210, by removing module 210, by installing module 210, etc.

At step 920, a distal end of a robotic arm may be adapted to switch between the plurality of interchangeable end effectors and select the module relocation effector as an active end effector for the robotic arm. Furthermore, the distal end of the robotic arm may be adapted by coupling a selection module that receives information about a type of the data-center module to the distal end of the robotic arm, coupling a rotatable unit that rotates to select the module relocation effector from the plurality of interchangeable end effectors as the active end effector, and/or coupling a connection that mates with the module relocation effector stored in an effector holder to the distal end of the robotic arm. In the example of FIG. 3, the distal end of robotic arm 302 may be adapted to rotate rotatable unit 304 to select module relocation effector 110 as the active end effector. In the example of FIG. 5B, the distal end of robotic arm 502 may be adapted to mate with module relocation effector 110 stored in effector holder 504.

At step 930, an actuator may be configured to move the robotic arm to cause the robotic arm to relocate, from one location in a data center to another location in the data center, a data-center module held by the module relocation effector. For example, actuator 802 of FIG. 8 may be configured to move robotic arm 402 to cause robotic arm 402 to relocate, from data-center-module housing mechanism 602(1) to data-center-module housing mechanism 602(3) in data center 800, data-center module 210 held by module relocation effector 110. In some embodiments, such as FIG. 5B, actuator 802 may also be configured to facilitate mating robotic arm 502 with module relocation effector 110 stored in effector holder 504.

In some examples, method 900 may further include a step in which the robotic arm is configured to utilize the module relocation effector to perform a removal of the data-center module from the location and/or an installation of the data-center module to the other location. As shown in FIG. 8, robotic arm 402 is configured to utilize module relocation effector 110, as part of robotic relocation apparatus 400, to remove data-center module 210 from slot 806(1) and install data-center module 210 to slot 806(2).

As discussed throughout the instant disclosure, the disclosed methods, systems, and apparatuses may provide one or more advantages over traditional data centers. For example, the data-center-module relocation devices described herein may select different tools to remove and/or install equipment modules of different sizes and/or configurations from data center racks. As another example, by rotating a selection of tools or picking a tool from a set of tools, the systems described herein may provide automatic on-the-fly switching of tools. Furthermore, the data-center-module relocation devices described herein may be implemented as part of a larger structure, such as a gantry robot, that facilitates movement between locations in a data center. Thus, the mechanisms described herein may enable automated management data centers, regardless of the types of equipment in the data centers, while reducing costs of labor and/or energy.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A data-center-module relocation system comprising:
a component relocation device having:
a plurality of interchangeable end effectors comprising at least one module relocation effector that is dimensioned to hold and/or store a data-center module and is configured to mount the data-center module by plugging in a cable into the data center module;
a robotic arm comprising a distal end adapted to:
switch between the plurality of interchangeable end effectors; and
select the module relocation effector as an active end effector for the robotic arm; and
a gantry robot that is coupled to the component relocation device and configured to use the robotic arm to cause the robotic arm to:
dismount the data-center module from one location in a data center;
move the data-center module to another location in the data center; and
mount the data-center module at the other location in the data center.

2. The data-center-module relocation system of claim 1, wherein the module relocation effector comprises at least one of:

a module receptacle; or a module mounting tool.

3. The data-center-module relocation system of claim 2, wherein the module mounting tool:
is coupled to the module receptacle such that the module mounting tool facilitates transfer of the data-center module from the location in the data center to the module receptacle;
is coupled to the module receptacle such that the module mounting tool facilitates transfer of the data-center module from the module receptacle to the other location in the data center; and
is customized for at least one of:
a dimension of the data-center module;
a cable connection of the data-center module;
an attachment of the data-center module; or
a mounting mechanism of the data-center module.

4. The data-center-module relocation system of claim 1, wherein the distal end of the robotic arm comprises at least one of:
a selection module that receives information about a type of the data-center module;
a rotatable unit that rotates to select the module relocation effector from the plurality of interchangeable end effectors as the active end effector; or
a connection that mates with the module relocation effector stored in an effector holder.

5. The data-center-module relocation system of claim 4, wherein the rotatable unit selects the module relocation effector as the active end effector for the robotic arm based on the received information about the type of the data-center module.

6. The data-center-module relocation system of claim 4, wherein an actuator is configured to move the robotic arm to facilitate mating with the module relocation effector stored in the effector holder.

7. The data-center-module relocation system of claim 1, wherein the cable comprises a power cable.

8. The data-center-module relocation system of claim 1, wherein the cable comprises.

9. The data-center-module relocation system of claim 1, wherein the module relocation effector is configured to dismount the data-center module by disengaging a mounting mechanism.

10. The data-center-module relocation system of claim 1, wherein the gantry robot is dimensioned to move the robotic arm parallel to a front of a data-center-module housing mechanism.

11. The data-center-module relocation system of claim 1, wherein the data-center module comprises at least one of:
a server; or
a network switch.

12. The data-center-module relocation system of claim 1, further comprising a mobile assembly configured to move the gantry robot on a track between rows of data-center-module housing mechanisms.

13. A data-center-module relocation system comprising:
at least one data-center-module housing mechanism;
at least one data-center module stored in the data-center-module housing mechanism; and
a robotic relocation apparatus comprising:
a plurality of interchangeable end effectors comprising at least one module relocation effector that is dimensioned to hold data-center modules;
a robotic arm comprising a distal end adapted to:
switch between the plurality of interchangeable end effectors; and
select the module relocation effector as an active end effector for the robotic arm; and
an actuator that moves the robotic arm to cause the robotic arm to relocate the data-center module from one location in a data center to another location in the data center.

14. The data-center-module relocation system of claim 13, wherein the data-center-module housing mechanism stores the data-center modules in a plurality of slots such that a face of the data-center-module housing mechanism exposes the data-center module to the robotic relocation apparatus.

15. The data-center-module relocation system of claim 14, wherein the robotic relocation apparatus is coupled to at least one of:
a gantry robot that is configured to move the data-center module parallel to the face of the data-center-module housing mechanism; or
a mobile assembly that facilitates moving the gantry robot from the data-center-module housing mechanism to an additional data-center-module housing mechanism.

16. The data-center-module relocation system of claim 15, wherein the robotic arm is configured to utilize the module relocation effector to perform at least one of:
removing the data-center module from a slot in the data-center-module housing mechanism;
installing the data-center module to another slot in the data-center-module housing mechanism; or
installing the data-center module to the additional data-center-module housing mechanism.

17. The data-center-module relocation system of claim 13, wherein the plurality of interchangeable end effectors is stored in at least one of:
a rotatable unit coupled to the distal end of the robotic arm; or
an effector holder stored in a secondary data-center-module housing mechanism.

18. The data-center-module relocation system of claim 13, wherein the module relocation effector is customized for at least one of:
a dimension of the data-center module;
a dimension of the data-center-module housing mechanism; or
a mounting mechanism that secures the data-center module to the data-center-module housing mechanism.

19. The data-center-module relocation system of claim 13, further comprising at least one additional robotic relocation apparatus configured to facilitate swapping the data-center module with an additional data-center module.

20. The data-center-module relocation system of claim 19, wherein the additional robotic relocation apparatus comprises an additional robotic arm adapted to select an additional module relocation effector that is dimensioned to hold the additional data-center module concurrent with the module relocation effector holding the data-center module.

* * * * *